United States Patent
Dunwoody

(10) Patent No.: US 10,656,001 B1
(45) Date of Patent: May 19, 2020

(54) SELF-LEVELING COMBINATION MEASURING DEVICES

(71) Applicant: Craig Whitfield Dunwoody, Omaha, NE (US)

(72) Inventor: Craig Whitfield Dunwoody, Omaha, NE (US)

( * ) Notice: Subject to any disclaimer, the term of this patent is extended or adjusted under 35 U.S.C. 154(b) by 0 days.

(21) Appl. No.: 16/454,976

(22) Filed: Jun. 27, 2019

Related U.S. Application Data

(60) Provisional application No. 62/690,626, filed on Jun. 27, 2018.

(51) Int. Cl.
*G01F 19/00* (2006.01)

(52) U.S. Cl.
CPC ................. *G01F 19/002* (2013.01)

(58) Field of Classification Search
CPC .............................. G01F 19/00; G01F 19/002
USPC ......................................................... 73/429
See application file for complete search history.

(56) References Cited

U.S. PATENT DOCUMENTS

| | | | | |
|---|---|---|---|---|
| 2,042,945 A | * | 6/1936 | Lemay | G01F 19/002 73/426 |
| 4,283,951 A | * | 8/1981 | Varpio | G01F 19/00 222/356 |
| 6,470,745 B1 | * | 10/2002 | Reay | G01F 19/002 116/284 |
| 9,476,749 B1 | * | 10/2016 | Wiggins | G01F 19/00 |
| 2010/0089151 A1 | * | 4/2010 | Mantilla | B65D 21/0233 73/426 |

* cited by examiner

*Primary Examiner* — Jamel E Williams
(74) *Attorney, Agent, or Firm* — Mallory M. Henninger; Advent, LLP

(57) ABSTRACT

A self-leveling combination measuring device includes a first measuring utensil having a handle including a top surface extending longitudinally along a first plane. The first measuring utensil defines a basin with a base and a first wall rigidly connected to the first handle. The first wall extends from the base and has a top perimeter aligned parallel to the first plane. The self-leveling measuring device also includes a second measuring utensil having a handle including a bottom surface configured to extend longitudinally along the first plane. The second measuring utensil has a second wall rigidly connected to the second handle with a bottom configured to align parallel to the first plane along which the top surface of the first handle extends to level material contained within the basin with the top perimeter of the first wall when the second measuring utensil is slid with respect to the first measuring utensil.

16 Claims, 14 Drawing Sheets

SELF-LEVELING COMBINATION MEASURING DEVICES

CROSS-REFERENCE TO RELATED APPLICATIONS

The present application claims the benefit under 35 U.S.C. § 119(e) of U.S. Provisional Application Ser. No. 62/690,626, filed Jun. 27, 2018, and titled "SELF-LEVELING COMBINATION MEASURING DEVICES," which is herein incorporated by reference in its entirety.

BACKGROUND

Measuring utensils, such as spoons and cups, can be used to measure amounts of an ingredient. Such utensils are often used to measure ingredient amounts for cooking and baking foods.

DRAWINGS

The Detailed Description is described with reference to the accompanying figures. The use of the same reference numbers in different instances in the description and the figures may indicate similar or identical items.

DETAILED DESCRIPTION

Figure 1:
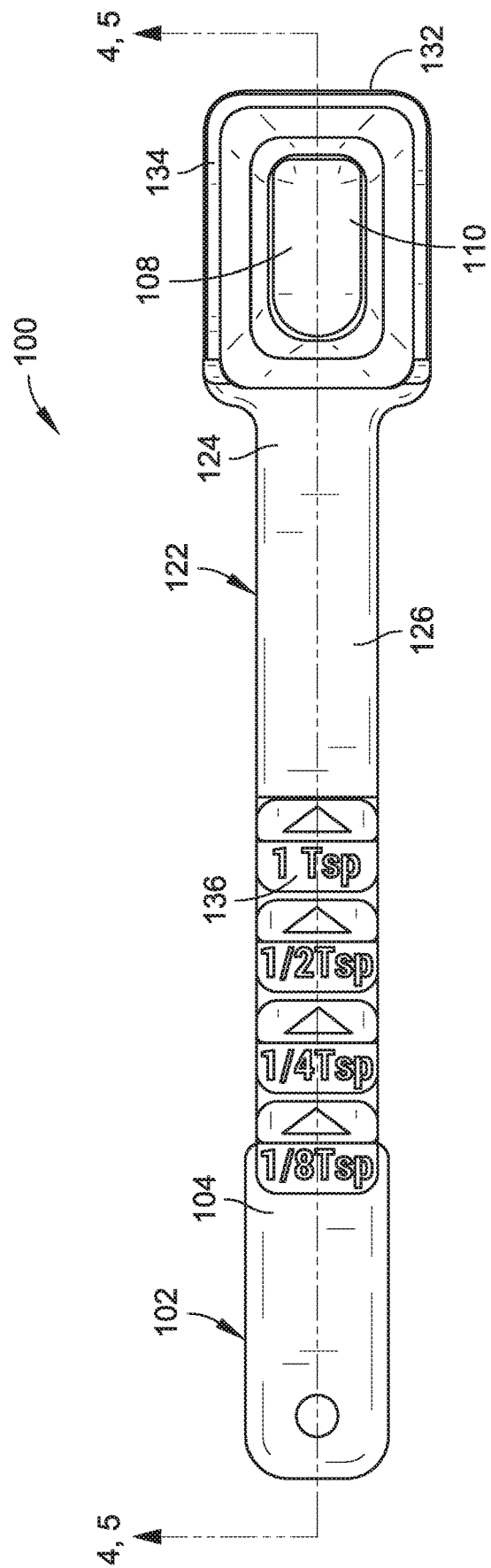
FIG. 1 is a top plan view illustrating a self-leveling combination measuring device in accordance with example embodiments of the present disclosure.
Figure 2:
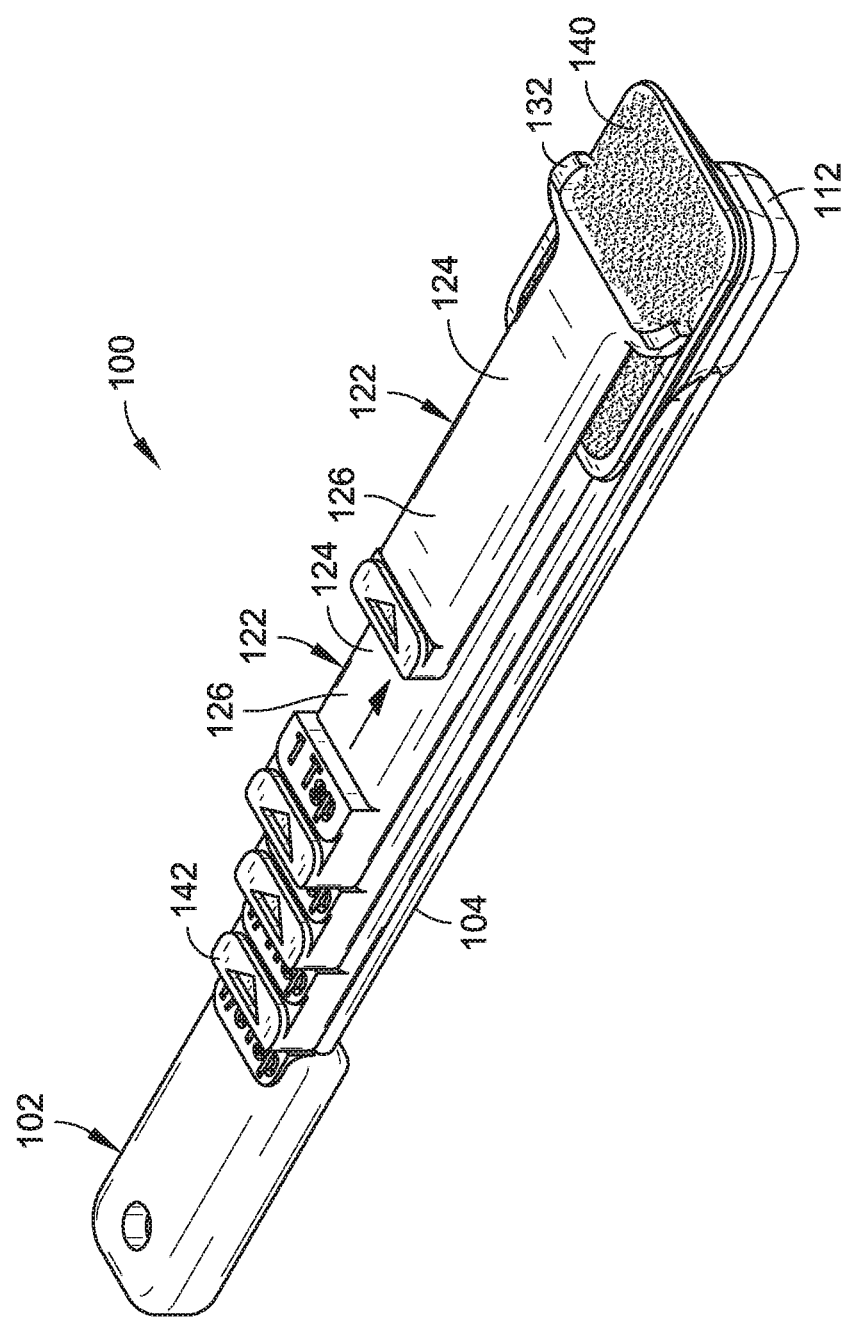
FIG. 2 is an isometric view of the self-leveling combination measuring device illustrated in FIG. 1.
Figure 3:
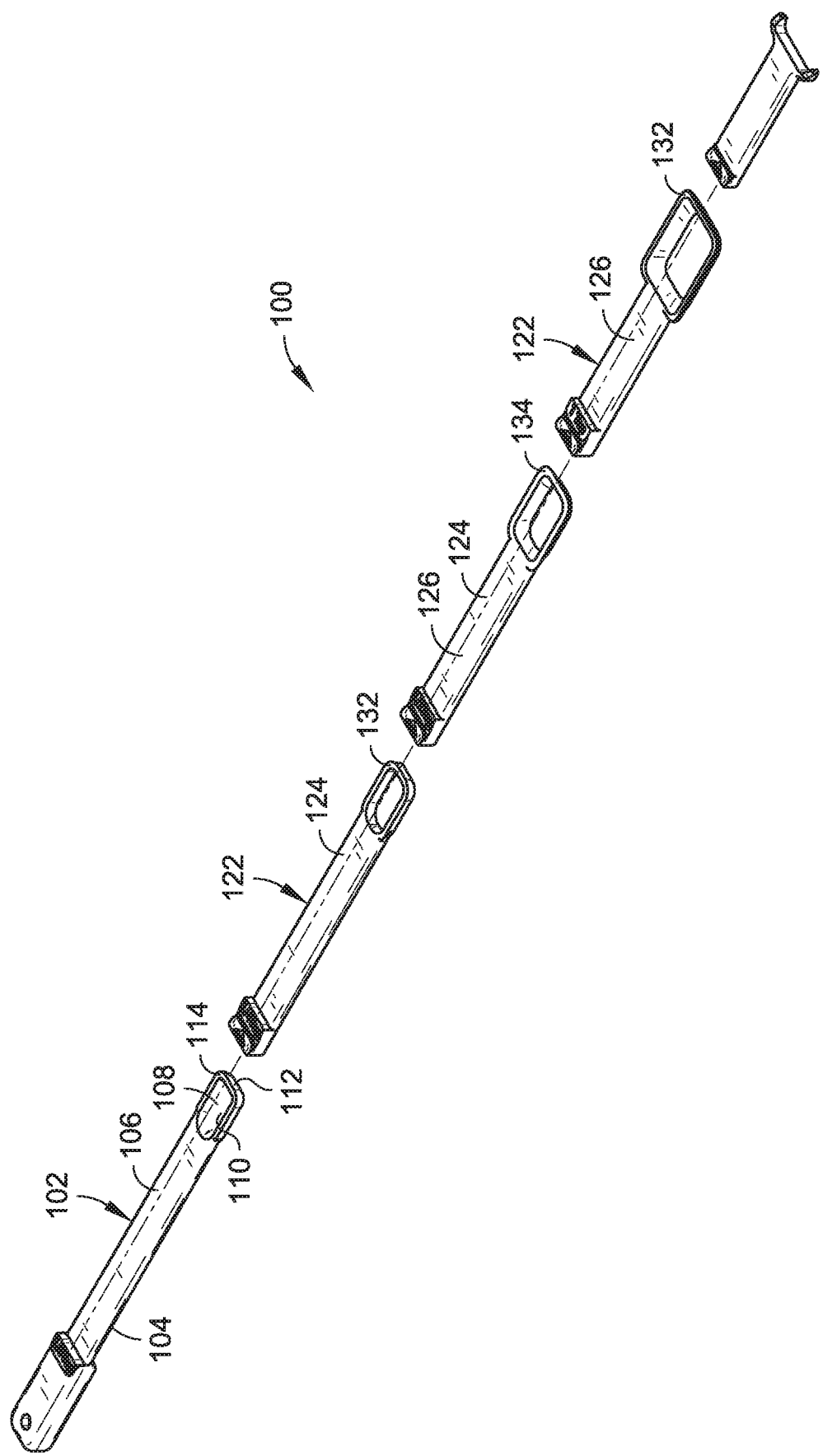
FIG. 3 is an exploded isometric view of the self-leveling combination measuring device illustrated in FIG. 1.
Figure 4:
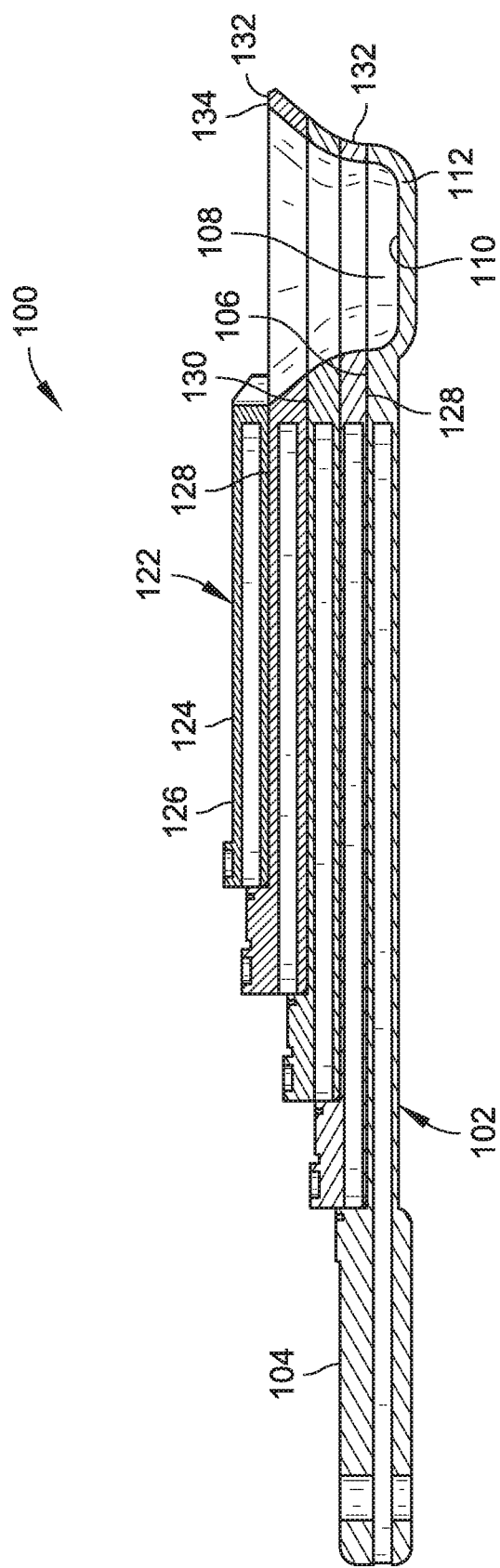
FIG. 4 is a partial cross-sectional side elevation view of the self-leveling combination measuring device illustrated in FIG. 1.
Figure 5:
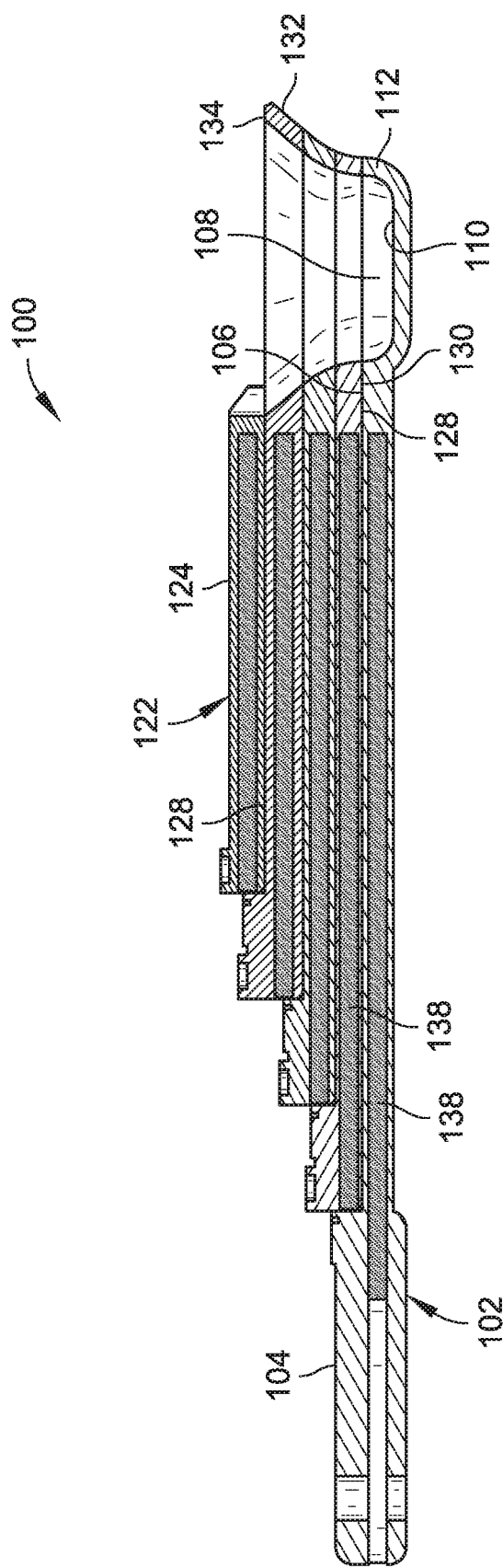
FIG. 5 is a cross-sectional side elevation view of the self-leveling combination measuring device illustrated in FIG. 1.
Figure 6:
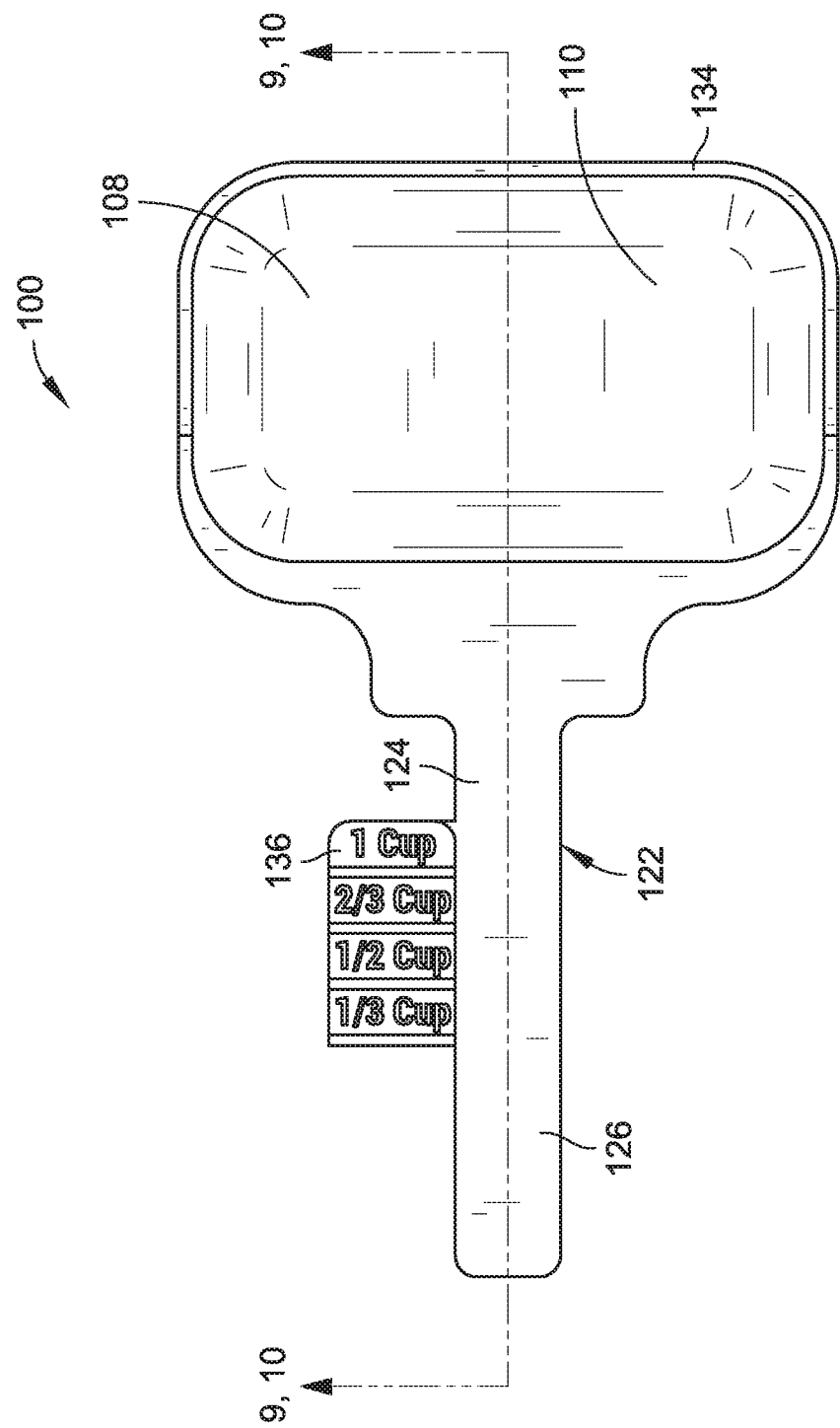
FIG. 6 is a top plan view illustrating another self-leveling combination measuring device in accordance with example embodiments of the present disclosure.
Figure 7:
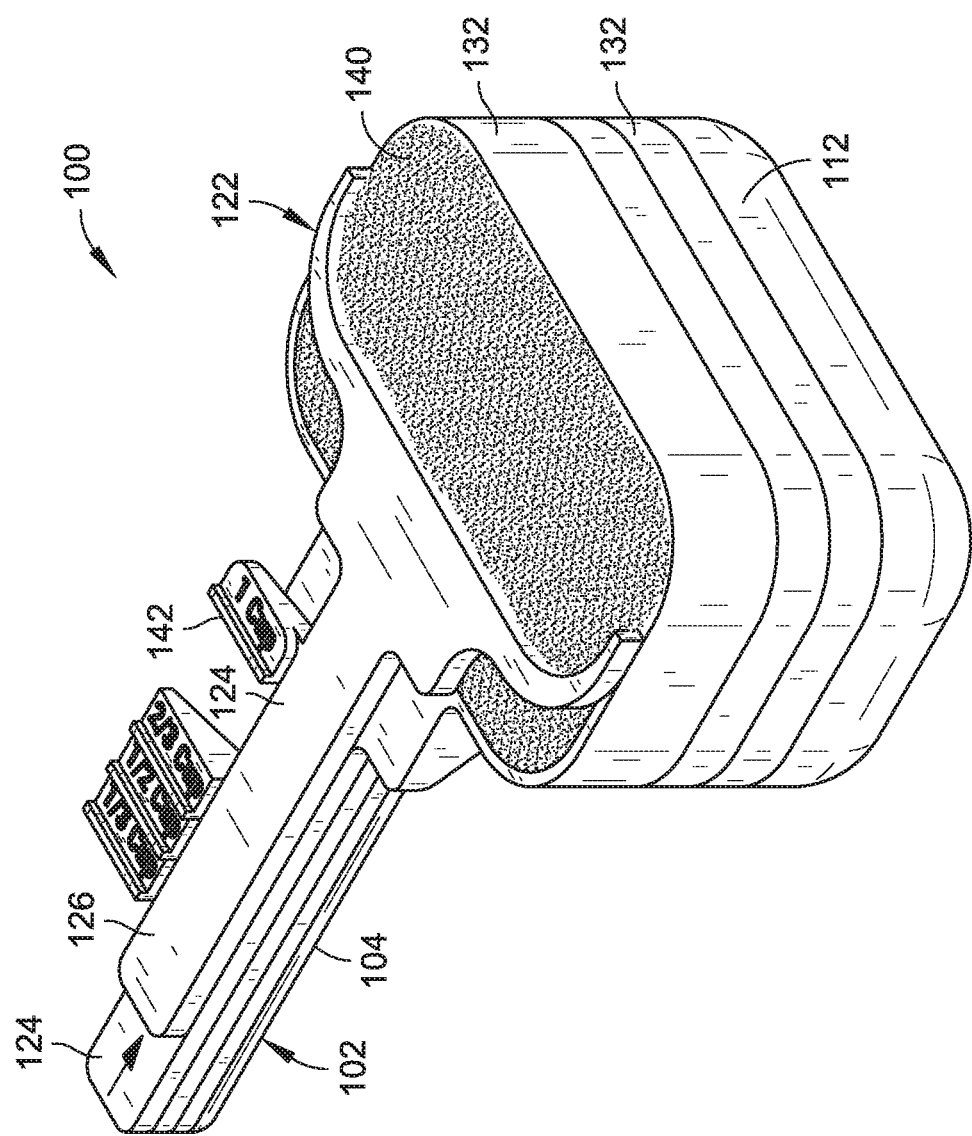
FIG. 7 is an isometric view of the self-leveling combination measuring device illustrated in FIG. 6.
Figure 8:
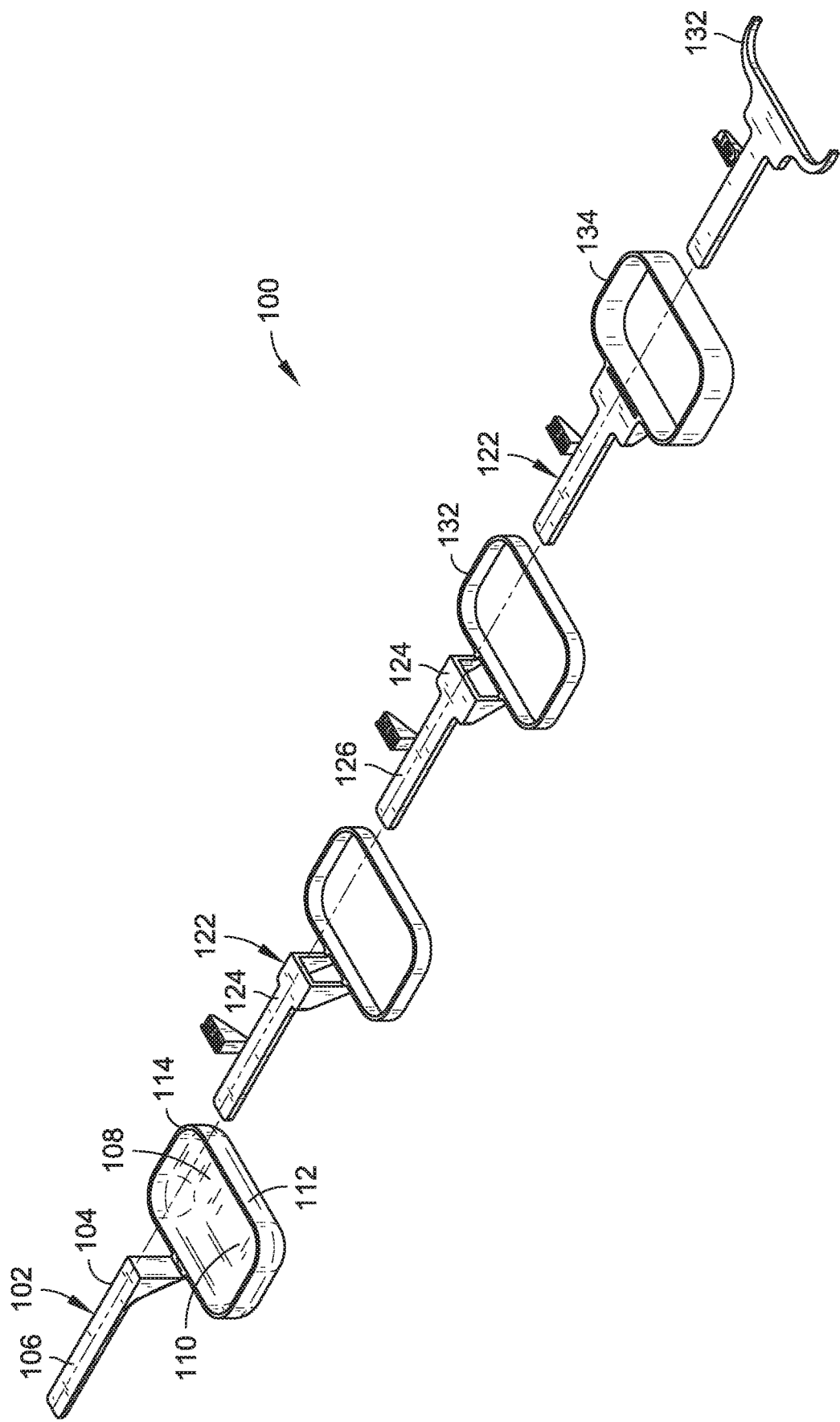
FIG. 8 is an exploded isometric view of the self-leveling combination measuring device illustrated in FIG. 6.
Figure 9:
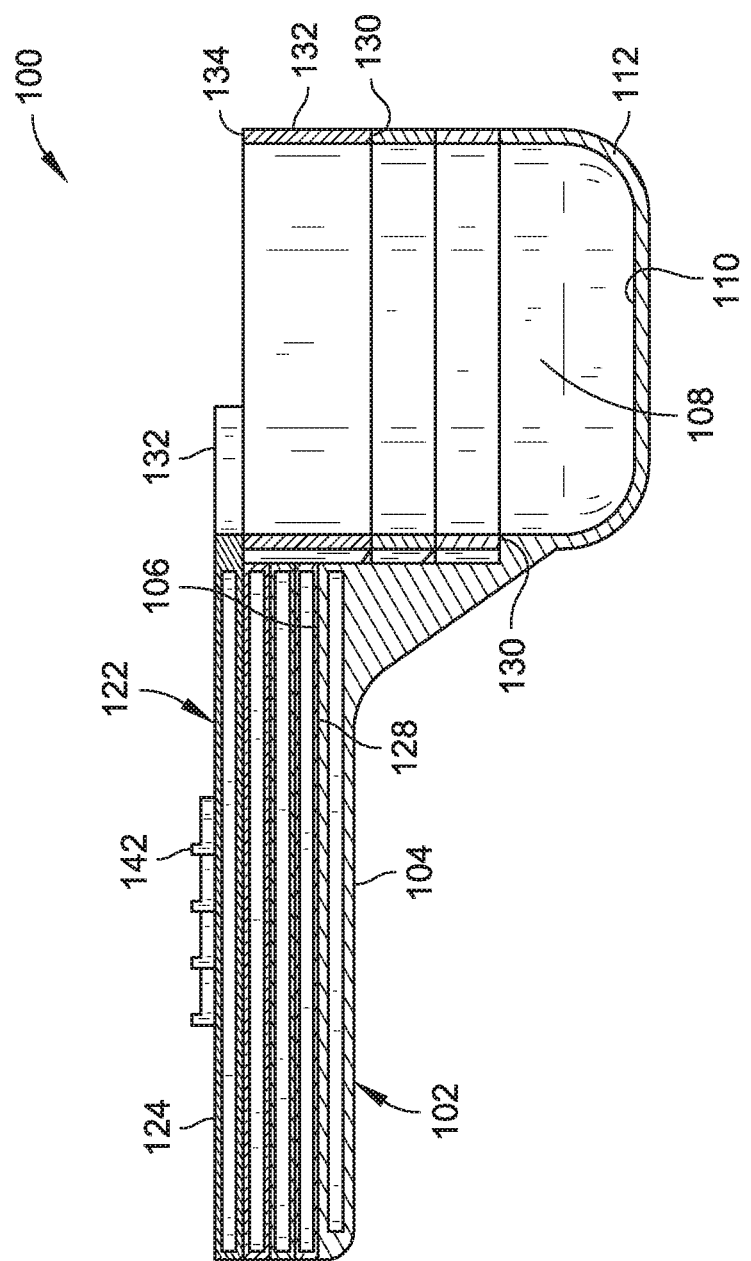
FIG. 9 is a partial cross-sectional side elevation view of the self-leveling combination measuring device illustrated in FIG. 6.
Figure 10:
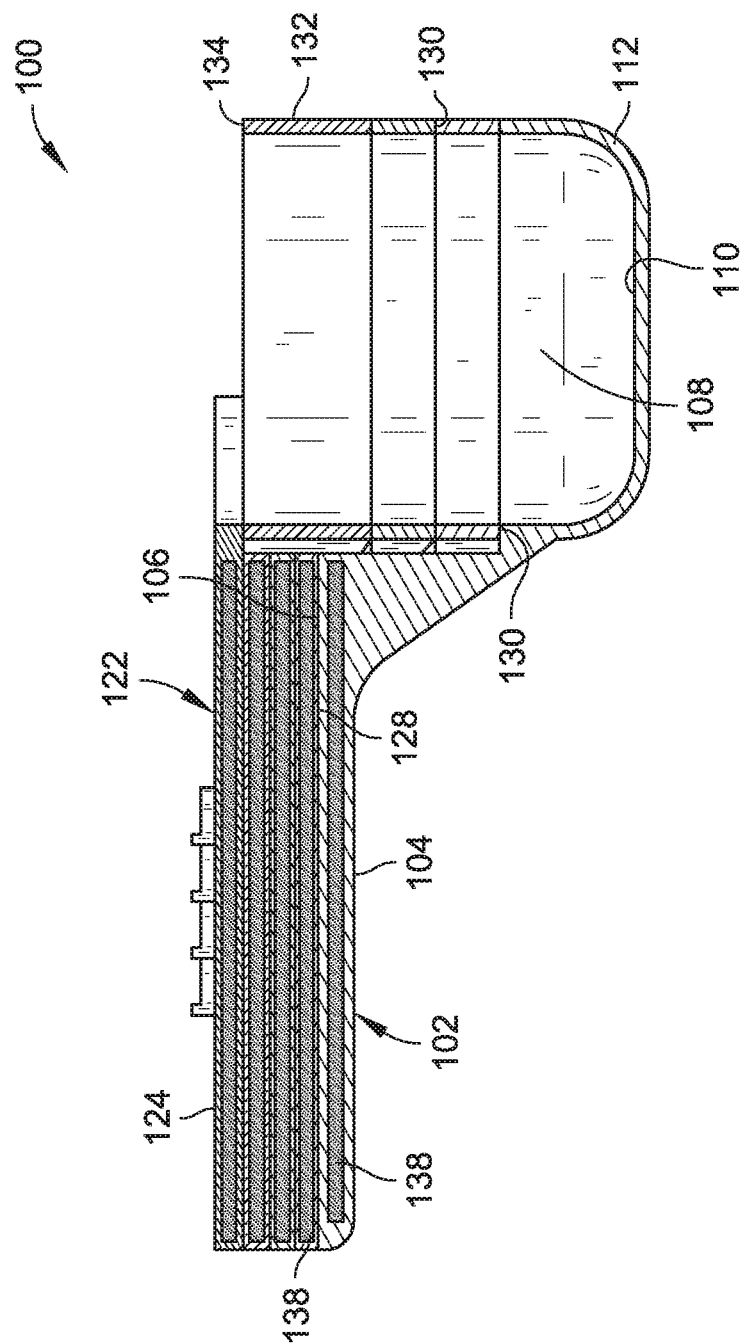
FIG. 10 is a cross-sectional side elevation view of the self-leveling combination measuring device illustrated in FIG. 6.

Referring generally to FIGS. 1 through 11, self-leveling measuring devices 100 are described. The self-leveling measuring devices 100 can provide a layered measuring instrument, such as a spoon and/or a cup, where the layers are stacked on top of one another layer to form a full measured container, and where each layer can slide forward to push material at and above that layer out of the utensil. In this manner, an all-in-one or combination measuring instrument is provided that is capable of self-leveling and metering out predetermined, measured amounts of various wet and dry materials, including, but not necessarily limited to: granular materials, such as sugar, salt, baking powder, seasoning, and so on, and liquid materials, such as oil, vinegar, and so forth.

A self-leveling measuring device 100 includes a first measuring utensil 102 having a first handle 104 including a first top surface 106 extending longitudinally along a first plane. In embodiments of the disclosure, the first measuring utensil 102 defines a basin 108 having a first specified volume (e.g., one-eight (⅛) teaspoon (tsp), one-third (⅓) cup, etc.). For example, the basin 108 is defined by a base 110 and a first wall 112 surrounding the base 110, where the first wall 112 is rigidly connected to the first handle 104. As described, the first wall 112 extends from the base 110 and has a first top perimeter 114 (FIGS. 3, 8) aligned parallel to the first plane along which the first top surface 106 of the first handle 104 extends.

The self-leveling measuring device 100 also includes one or more additional second measuring utensils 122 configured to be supported upon the first measuring utensil 102 (or upon another second measuring utensil 122) and to slide with respect to the first measuring utensil 102 (or with respect to another adjacent second measuring utensil 122). The second measuring utensil 122 has a second handle 124 including a first bottom surface 128 (FIGS. 4, 5, 9, 10) configured to extend longitudinally along the first plane of the first top surface 106 of the first handle 104 (or along a top surface of another second measuring utensil 122) when the second measuring utensil 122 is supported upon the first measuring utensil 102 (or upon another adjacent second measuring utensil 122). In embodiments of the disclosure, the second measuring utensil 122 also has a second wall 132, where the second wall 132 is rigidly connected to the second handle 124.

The second wall 132 has a first bottom 130 (FIGS. 4, 5, 9, 10) configured to align parallel to the first plane along which the first top surface 106 of the first handle 104 extends to level material 140 (FIGS. 2, 7) contained within the basin 108 with the first top perimeter 114 of the first wall 112 when the second measuring utensil 122 is slid with respect to the first measuring utensil 102. In some embodiments, the second handle 124 includes a second top surface 126 extending longitudinally along a second plane. The first bottom 130 of the second wall 132 may then be configured to extend around the first top perimeter 114 of the first wall 112 when the second measuring utensil 122 is supported upon the first measuring utensil 102 (or upon another second measuring utensil 122). For example, the second wall 132 has a second top perimeter 134 aligned parallel to the second plane along which the second top surface 126 of the second handle 124 extends.

Another (e.g., third) measuring utensil 122 can be supported upon a second measuring utensil 122 and may slide with respect to the second measuring utensil 122. In this configuration, the third measuring utensil 122 can have a third handle 124 including a second bottom surface 128 configured to extend longitudinally along the second plane of the second top surface 126 of the second handle 124 when the third measuring utensil 122 is supported upon the second measuring utensil 122. In embodiments of the disclosure, the third measuring utensil 122 has a third wall 132, where the third wall 132 is rigidly connected to the third handle 124. The third wall 132 may also have a second bottom 130 configured to align parallel to the second plane along which the second top surface 126 of the second handle 124 extends to level the material 140 contained within the basin 108 and the second wall 132 with the second top perimeter 134 of the second wall 132 when the third measuring utensil 122 is slid with respect to the second measuring utensil 122. In some embodiments (e.g., where the third measuring utensil 122 is a top layer), the third wall 132 may not fully extend around the top perimeter of the wall below (e.g., when at the topmost level). The third handle 124 can have a third top surface 126 extending longitudinally along a third plane, the third wall 132 can have a third top perimeter 134 aligned parallel to the second plane along which the second top surface 126 of the second handle 124 extends, and so forth.

In this manner, the basin 108 and one or more additional walls (e.g., the second wall 132, the third wall 132, and possibly further additional walls) form increasingly larger volumes as utensils 102 and 122 are stacked upon one another, e.g., as the volume contributed by each additional wall combines with the volumes of the basin 108 and preceding walls to form additional, larger volumes. Thus, a measuring instrument, such as a spoon or cup, can be divided into layers, where each layer is stacked on top of another layer forming a full measured container, and each layer can slide forward pushing material at and above that layer out of the utensil. In this manner, the utensils 102 and 122 can be used to level the amount of material in a self-leveling measuring device 100, leaving behind a precise amount of material as selected by a user. Furthermore, one or more of the layers can be used to measure liquid materials, such as oil, vinegar, and so forth. For example, one or more layers may be removed from the self-leveling measuring device 100 and material may be poured or scooped into the remaining layers (e.g., two layers may be used to measure a quarter teaspoon of material).

The sums of the volumes in lower layers of the utensils 102 and 122 equate to volumetric measurements for a self-leveling measuring device 100. The following table illustrates volumetric measurements by layer as described with reference to FIGS. 1 through 5 and 11:

| Amount to Measure | Layers with Amount | Layer to Slide |
|---|---|---|
| One-eighth teaspoon | 1st (bottom) layer | 2nd layer |
| One-quarter teaspoon | 1st and 2nd layers | 3rd layer |
| One-half teaspoon | 1st, 2nd, and 3rd layers | 4th layer |
| One teaspoon | 1st, 2nd, 3rd, and 4th layers | 5th (top) layer |

In some embodiments, indicia 136 may be used to indicate volumes. For instance, the following table illustrates indicia by layer as described with reference to FIGS. 1 through 5 and 11:

| Layer | Indicia |
|---|---|
| 1st (bottom) layer | ⅛ Tsp |
| 2nd layer | → ¼ Tsp |
| 3rd layer | → ½ Tsp |
| 4th layer | → 1 Tsp |
| 5th (top) layer | → |

As shown, an indicator, such as an arrowhead ("→") or another symbol, can be used to indicate that a layer should be slid forward to leave behind an amount of material as indicated by measurement indicia on the layer below.

Figure 11:
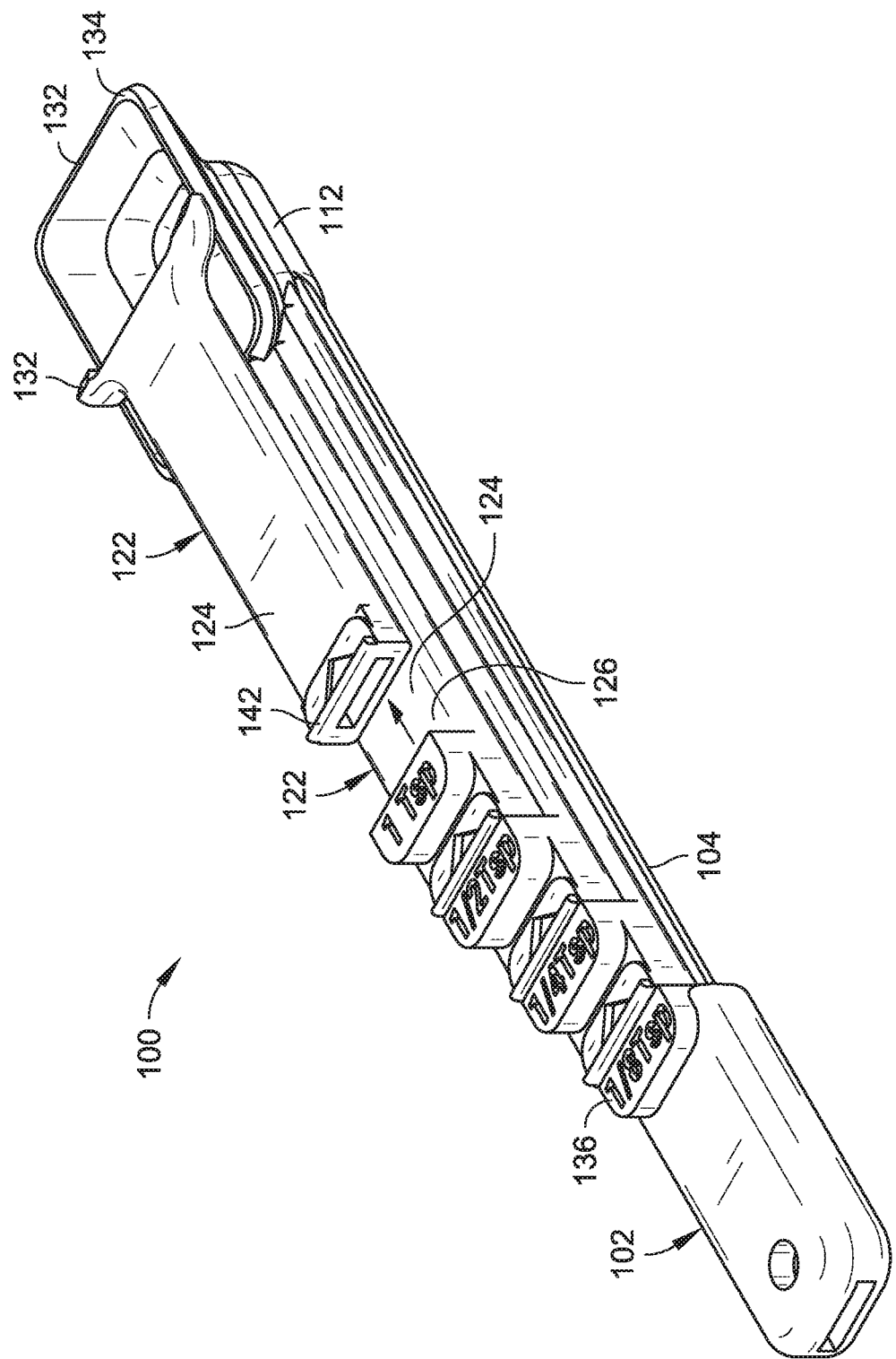
FIG. 11 is an isometric view illustrating a further self-leveling combination measuring device in accordance with example embodiments of the present disclosure.

In some embodiments, one or more utensils 102 and 122 can also include a tab 142 for leveling material (e.g., as described with reference to FIGS. 6 through 11). The tabs 142 can enable an operator to more easily "catch" a layer with a finger or thumb and slide that layer upon a layer immediately adjacent (e.g., below). As described herein, indicia 136 and tabs 142 may be at different elevations for each respective layer. For example, as shown in FIG. 11, "1 Tsp" indicia may be positioned ahead of and above tab 142 and arrowhead indicia for the 4th layer. This arrangement may provide a visual indication that the measurement ahead of and above the tab represents the volume contained in that layer and the layer(s) below (i.e., the 1st, 2nd, 3rd, and 4th layers), while the arrowhead below and behind the tab provides a directional instruction to slide the 4th layer forward to measure out an amount of material equal to the measurement immediately adjacent to, and at the same level as, the arrowhead ("½ Tsp").

However, it should be noted that this labeling scheme is provided by way of example and is not meant to limit the present disclosure. In other embodiments, different indicia and/or tab configurations can be used. For example, the following table illustrates volumetric measurements by layer as described with reference to FIGS. 6 through 10:

| Amount to Measure | Layers with Amount | Layer to Slide |
|---|---|---|
| One-third cup | 1st (bottom) layer | 2nd layer |
| One-half cup | 1st and 2nd layers | 3rd layer |
| Two-thirds cup | 1st, 2nd, and 3rd layers | 4th layer |
| One cup | 1st, 2nd, 3rd, and 4th layers | 5th (top) layer |

And the following table illustrates indicia by layer as described with reference to FIGS. 6 through 10. As shown, each label for a layer indicates a measurement for the volume contained in the layer immediately below that layer and any other layers below the lower layer:

| Layer | Indicia |
|---|---|
| 1st (bottom) layer | (none) |
| 2nd layer | ⅓ Cup |
| 3rd layer | ½ Cup |
| 4th layer | ⅔ Cup |
| 5th (top) layer | 1 Cup |

This arrangement can provide a visual indication that the measurement indicated above a layer represents the total volume contained in the layer(s) below. In some embodiments, this labeling scheme can also be used with an arrangement where indicia are marked on top surfaces 126 of one or more handles 124 of the utensils 122 (possibly with or without tabs 142). For example, with reference to an alternative arrangement to the arrangement shown in FIG. 11, a "1 Tsp" marking can be placed on a 5th (top) layer, a "½ Tsp" marking can be placed on a 4th layer, a "¼ Tsp" marking can be placed on a 3rd layer, and a "⅛ Tsp" marking can be placed on a 2nd layer to indicate the volumes contained in the layer immediately below each marked layer and any other layers below that layer. Further, in some embodiments, a utensil 122 may be configured to obscure or hide (e.g., be positioned over and/or on top of) indicia marked on a lower layer utensil 102 and/or 122. In this manner, fewer indicia (e.g., one marking) may be visible when the utensils 102 and 122 are in the stacked configuration, e.g., where the top and bottom walls of the utensils are aligned. Further, this may allow the visible indicia to provide the indication of the volume of the stacked utensils while obscuring other volumes of lesser numbers of stacked utensils.

Figure 13:
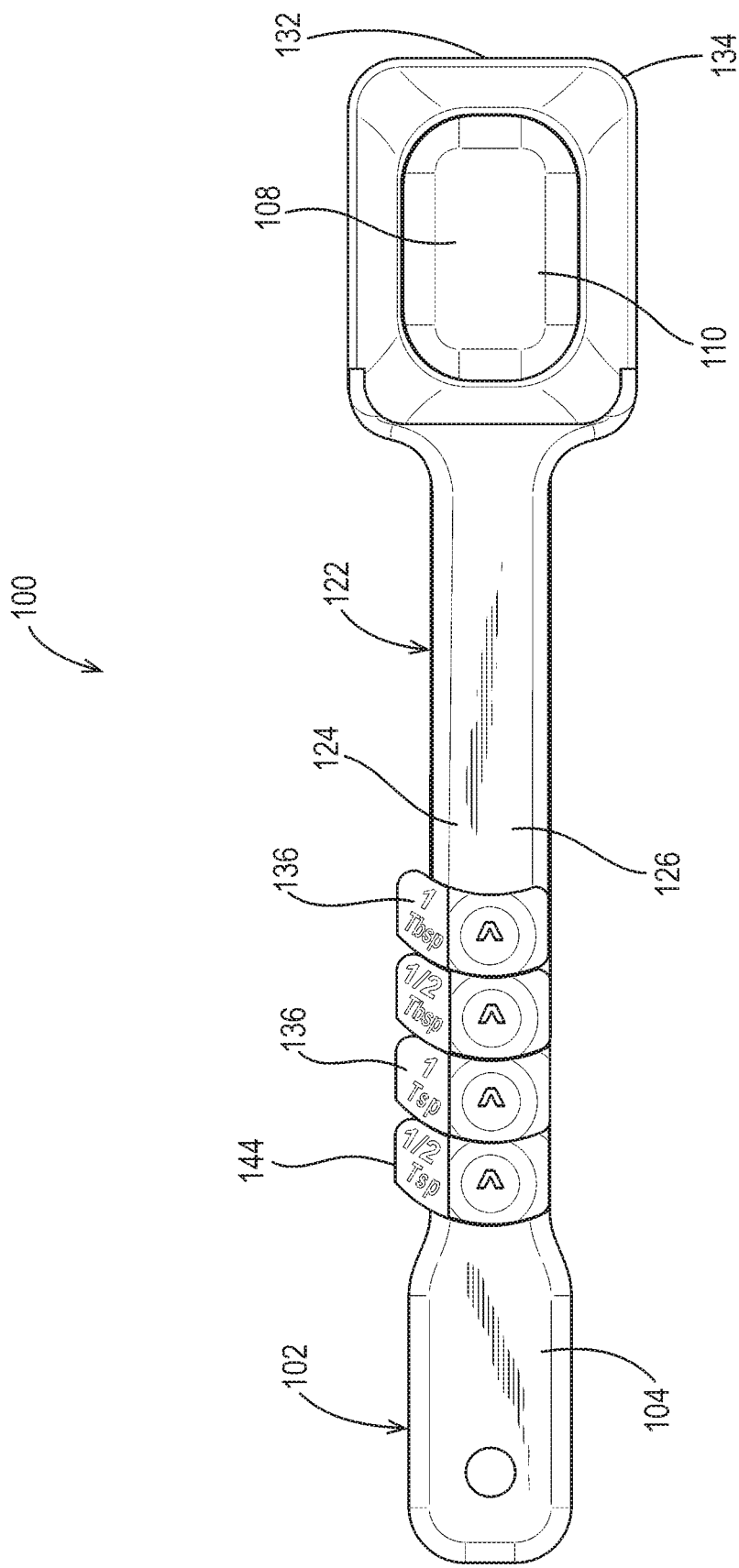
FIG. 13 is a top plan view illustrating another self-leveling combination measuring device in accordance with example embodiments of the present disclosure.
Figure 14:
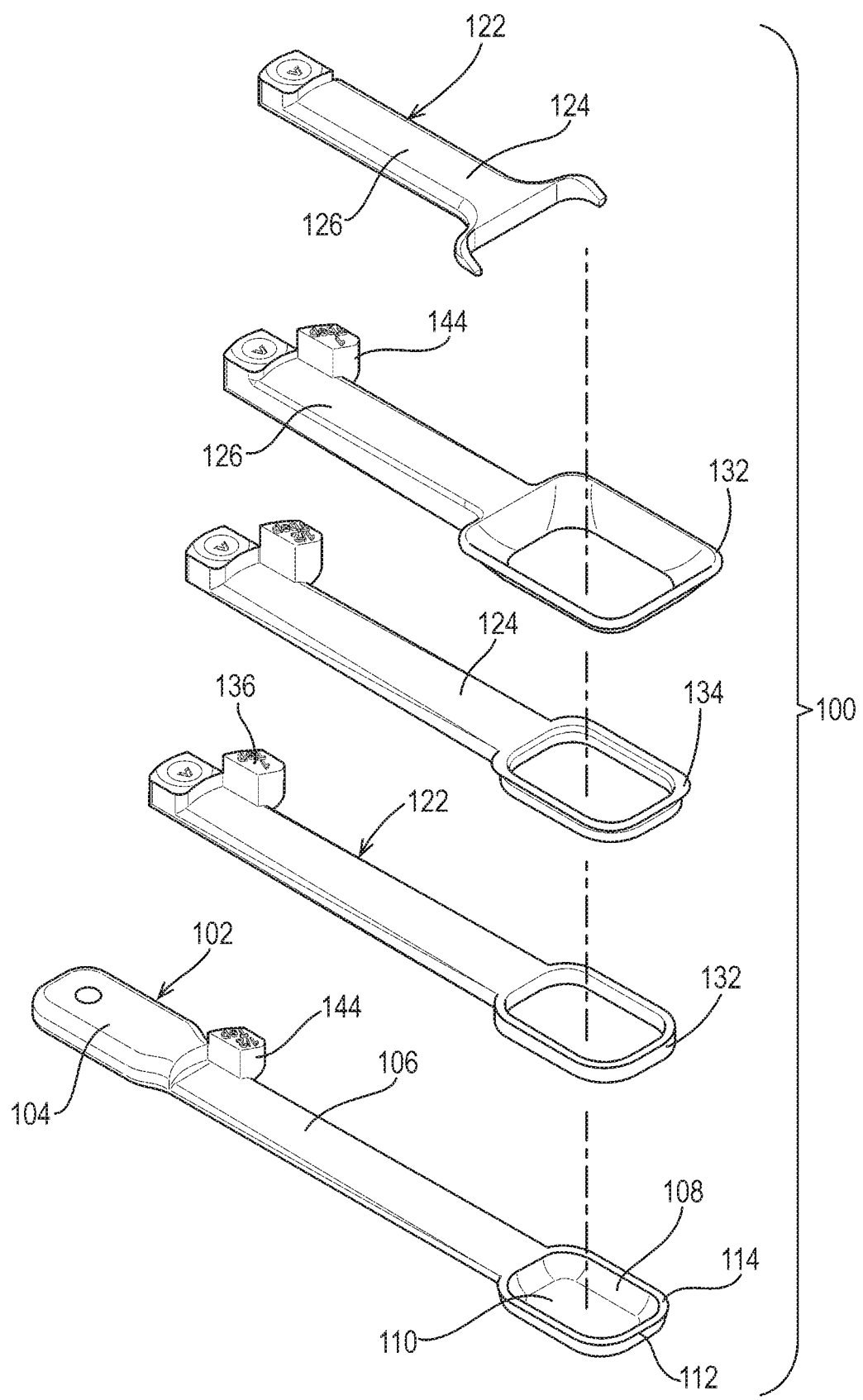
FIG. 14 is an exploded isometric view of the self-leveling combination measuring device illustrated in FIG. 13.

With reference to FIGS. 13 and 14, in some embodiments an indicator, such as an arrowhead or another symbol, can be used to indicate that a layer should be slid forward to leave behind an amount of material as indicated by measurement indicia on the layer below, where the indicia on the layer below is printed on an extension 144 oriented to a side of the arrowhead (and possibly level with the arrowhead) when the layers are aligned (e.g., as shown with reference to FIG. 13). As shown in FIG. 14, "1 Tbsp" indicia on a 4th layer may be positioned on an extension 144 configured to be oriented to the side of and generally level with arrowhead indicia on a 5th (top) layer. This arrangement may provide a visual indication that the measurement to the side of and level with the top arrowhead represents the volume contained in the 4th layer and the layers below, while the arrowhead below and behind the extension 144 on the 4th layer provides a directional instruction to slide the 4th layer forward to measure out an amount of material equal to a measurement to the side of and generally level with the 4th layer arrowhead (i.e., "½ Tbsp" as indicated by indicia on the 3rd layer).

The first measuring utensil 102 and the second measuring utensil 122 can be biased into an orientation with respect to one another where the first top perimeter 114 of the first wall 112 and the first bottom 130 of the second wall 132 are aligned. For example, the first measuring utensil 102 and the second measuring utensil 122 may be biased into an orientation with respect to one another by biasing devices such as a magnet 138 in the first handle 104 of the first measuring utensil 102 and another magnet 138 in the second handle 124 of the second measuring utensil 122 (e.g., as described with reference to FIGS. 5 and 10). It should be noted that magnetic biasing devices are provided by way of example and are not meant to limit the present disclosure. In other embodiments, different biasing devices (e.g., springs) can be used to bias the layers with respect to one another. Further, it should be noted that biasing devices may include other mechanical arrangements where one layer is slidably attached to another layer. For example, a tongue-and-groove-type configuration may be used to slidably connect one or more adjacent layers together.

As described herein, the magnets 138 attaching the layers together can be longitudinal, rectangular, embedded neodymium magnets, where each magnet 138 is arranged the full length of each handle. However, longitudinal neodymium magnets are provided by way of example and are not meant to limit the present disclosure. In other embodiments, differently shaped magnets (e.g., multiple disc-shaped magnets arranged in a row or multiple rows) and/or magnets formed of different materials can be used. In some embodiments, the magnets 138 may be inserted from an end of a layer and slid into the layer. Then, a plug or another endcap may be used to seal an end of the layer. In some embodiments, the magnets 138 may be inserted from a side of a layer (e.g., into a bottom channel beneath a handle), and a cap or a strip of material may be used to cover the side of the layer (e.g., the bottom side) and secure the magnets in the handle. As described, a plug, an endcap, a cap, a strip, or another material to secure the magnets may be adhered to the handle material using an adhesive, a weld (e.g., sonic welding, ultrasonic welding) and/or another fastening technique (e.g., screws and/or other fasteners). In other embodiments, a magnet 138 may be insert molded into a layer when the layer is fabricated. Additionally, one or more magnets 138 may be affixed to a layer with an adhesive, such as glue. The attraction between the magnets 138 can hold a self-leveling measuring device 100 together. In some embodiments, the polarity of each magnet can be arranged such that the same (e.g., north) polarity faces the top side of each handle. This configuration allows the various layers to self-align while being attracted toward one another. Moreover, by opposing the sliding of a layer, each layer can be automatically biased by the magnets 138 toward retracting when slid forward. It should also be noted that this configuration promotes self-assembly of the self-leveling measuring device 100.

In some embodiments, the basin 108 and one or more additional walls (e.g., the second wall 132, the third wall 132) can be shaped so that there is a predictable relationship between the thicknesses of adjacent layers. For example, a linear relationship can be provided, where each layer has at least substantially the same thickness. Various arrangements are provided using shapes for the basin 108 and the one or more additional walls to provide the desired volumetric containment. Some examples of various containment shapes are described with reference to the cross-sections shown in FIGS. 4, 5, 9, and 10. In some embodiments, each successive layer positioned above a lower layer may be thicker than the preceding layer (e.g., by a percentage). This arrangement can facilitate, for example, a weakening magnetic field, which may bias lower layers to resist sliding with respect to one another when an upper layer is slid. A weakening magnetic field may also be provided by magnets having different magnetic strengths (e.g., a magnet being longer than an adjacent magnet, a magnet being thicker than an adjacent magnet, etc.).

Figure 12:
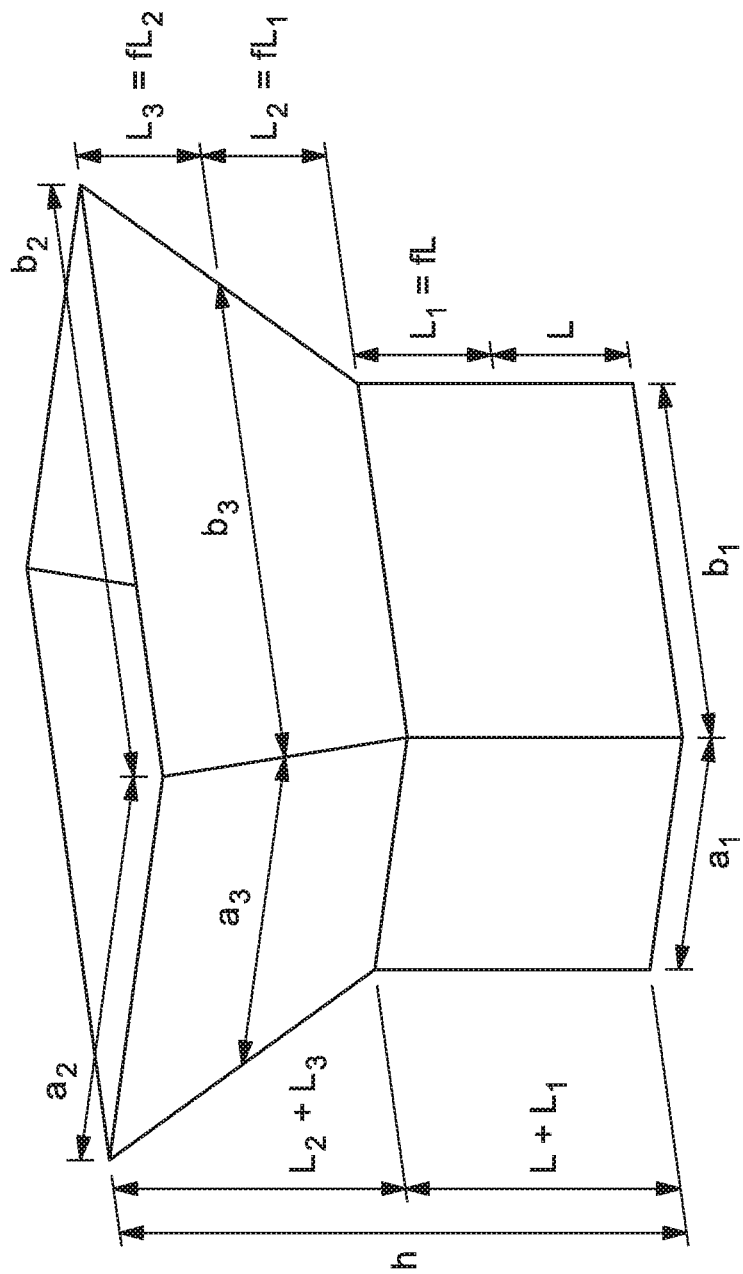
FIG. 12 is a perspective view illustrating an example layer arrangement for a self-leveling combination measuring device in accordance with example embodiments of the present disclosure.

With reference to FIG. 12 and the following table and formulas, the heights for the various layers can be calculated. In this example, each layer is about thirteen percent (13%) taller than the preceding layer (f=1.13) and the overall height, h, is equal to about 14.6 mm. However, these calculations are provided by way of example and are not meant to limit the present disclosure. In other embodiments, different heights, volumes, and dimensions can be used to provided different volumes and/or layer heights.

| Layer | Height (mm) | Volume (mm$^2$) | Base (mm) | Top (mm) |
| --- | --- | --- | --- | --- |
| L (1st layer) | 3.00 | 661.5 | $a_1 = 10.5$; $b_1 = 21.0$ | $a_1 = 10.5$; $b_1 = 21.0$ |
| $L_1$ (2nd layer) | 3.39 | 1409.0 | $a_1 = 10.5$; $b_1 = 21.0$ | $a_1 = 10.5$; $b_1 = 21.0$ |
| $L_2$ (3rd layer) | 3.83 | 2651.7 | $a_1 = 10.5$; $b_1 = 21.0$ | $a_3 = 16.4$; $b_3 = 26.9$ |
| $L_3$ (4th layer) | 4.33 | 5239.5 | $a_3 = 16.4$; $b_3 = 26.9$ | $a_2 = 23.0$; $b_2 = 33.5$ |

Volume Calculations $$\text{1st layer} = a_1 \times b_1 \times L$$

$$\text{2nd layer} = a_1 \times b_1 \times (L + L_1)$$

3rd layer =

-continued $$\frac{1}{6} \times L_2 \times (a_3 \times b_3 + (a_3 + a_1) \times (b_3 + b_1) + a_1 \times b_1) + (a_1 \times b_1 \times (L + L_1))$$

$$\text{4th layer} = \frac{1}{6} \times (L_2 + L_3) \times (a_2 \times b_2 + (a_2 + a_1) \times (b_2 + b_1) + a_1 \times b_1) +$$

$$(a_1 \times b_1 \times (L + L_1))$$

Layer Height Calculations $$a_3 = a_1 + (a_2 - a_1) \times \left(\frac{L2}{L3 + L2}\right)$$

$$b_3 = b_1 + (b_2 - b_1) \times \left(\frac{L2}{L3 + L2}\right)$$

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A self-leveling measuring device, comprising:
a first measuring utensil having a first handle including a first top surface extending longitudinally along a first plane, the first measuring utensil defining a basin having a first specified volume, the basin defined by a base and a first wall surrounding the base, the first wall rigidly connected to the first handle, the first wall extending from the base and having a first top perimeter aligned parallel to the first plane along which the first top surface of the first handle extends;
a second measuring utensil configured to be supported upon the first measuring utensil and to slide with respect to the first measuring utensil, the second measuring utensil having a second handle including a first bottom surface configured to extend longitudinally along the first plane of the first top surface of the first handle when the second measuring utensil is supported upon the first measuring utensil, the second measuring utensil having a second wall, the second wall rigidly connected to the second handle, the second wall having a first bottom configured to align parallel to the first plane along which the first top surface of the first handle extends to level material contained within the basin with the first top perimeter of the first wall when the second measuring utensil is slid with respect to the first measuring utensil, wherein the second handle includes a second top surface extending longitudinally along a second plane, the first bottom of the second wall configured to extend around the first top perimeter of the first wall, the second wall having a second top perimeter aligned parallel to the second plane along which the second top surface of the second handle extends; and
a third measuring utensil configured to be supported upon the second measuring utensil and to slide with respect to the second measuring utensil, the third measuring utensil having a third handle including a second bottom surface configured to extend longitudinally along the second plane of the second top surface of the second handle when the third measuring utensil is supported upon the second measuring utensil, the third measuring utensil having a third wall, the third wall rigidly connected to the third handle, the third wall having a second bottom configured to align parallel to the second plane along which the second top surface of the second handle extends to level material contained within the basin and the second wall with the second top perimeter of the second wall when the third measuring utensil is slid with respect to the second measuring utensil.

2. The self-leveling measuring device as recited in claim 1, wherein the first measuring utensil and the second measuring utensil are biased into an orientation with respect to one another where the first top perimeter of the first wall and the first bottom of the second wall are aligned.

3. The self-leveling measuring device as recited in claim 1, wherein the first measuring utensil and the second measuring utensil are biased into an orientation with respect to one another by a first magnet in the first handle of the first measuring utensil and a second magnet in the second handle of the second measuring utensil.

4. The self-leveling measuring device as recited in claim 3, wherein the first magnet has a different magnetic strength than the second magnet.

5. The self-leveling measuring device as recited in claim 1, wherein at least one of the first measuring utensil or the second measuring utensil includes indicia indicating a volume of at least the basin.

6. A self-leveling measuring device, comprising:
a first measuring utensil having a first handle including a first top surface extending longitudinally along a first plane, the first measuring utensil defining a basin having a first specified volume, the basin defined by a base and a first wall surrounding the base, the first wall rigidly connected to the first handle, the first wall extending from the base and having a first top perimeter aligned parallel to the first plane along which the first top surface of the first handle extends;
a second measuring utensil configured to be supported upon the first measuring utensil and to slide with respect to the first measuring utensil, the second measuring utensil having a second handle including a first bottom surface configured to extend longitudinally along the first plane of the first top surface of the first handle when the second measuring utensil is supported upon the first measuring utensil, the second measuring utensil having a second wall, the second wall rigidly connected to the second handle, the second wall having a first bottom configured to align parallel to the first plane along which the first top surface of the first handle extends to level material contained within the basin with the first top perimeter of the first wall when the second measuring utensil is slid with respect to the first measuring utensil, wherein the first measuring utensil and the second measuring utensil are biased into an orientation with respect to one another where the first top perimeter of the first wall and the first bottom of the second wall are aligned, wherein the second handle includes a second top surface extending longitudinally along a second plane, the first bottom of the second wall configured to extend around the first top perimeter of the first wall, the second wall having a second top perimeter aligned parallel to the second plane along which the second top surface of the second handle extends; and
a third measuring utensil configured to be supported upon the second measuring utensil and to slide with respect to the second measuring utensil, the third measuring utensil having a third handle including a second bottom surface configured to extend longitudinally along the second plane of the second top surface of the second handle when the third measuring utensil is supported upon the second measuring utensil, the third measuring utensil having a third wall, the third wall rigidly connected to the third handle, the third wall having a second bottom configured to align parallel to the second plane along which the second top surface of the second handle extends to level material contained within the basin and the second wall with the second top perimeter of the second wall when the third measuring utensil is slid with respect to the second measuring utensil.

7. The self-leveling measuring device as recited in claim 6, wherein the first measuring utensil and the second measuring utensil are biased into an orientation with respect to one another by a first magnet in the first handle of the first measuring utensil and a second magnet in the second handle of the second measuring utensil.

8. The self-leveling measuring device as recited in claim 7, wherein the first magnet has a different magnetic strength than the second magnet.

9. The self-leveling measuring device as recited in claim 6, wherein at least one of the first measuring utensil or the second measuring utensil includes indicia indicating a volume of at least the basin.

10. A self-leveling measuring device, comprising:
a first measuring utensil having a first handle including a first top surface extending longitudinally along a first plane, the first measuring utensil defining a basin having a first specified volume, the basin defined by a base and a first wall surrounding the base, the first wall rigidly connected to the first handle, the first wall extending from the base and having a first top perimeter aligned parallel to the first plane along which the first top surface of the first handle extends; and
a second measuring utensil configured to be supported upon the first measuring utensil and to slide with respect to the first measuring utensil, the second measuring utensil having a second handle including a first bottom surface configured to extend longitudinally along the first plane of the first top surface of the first handle when the second measuring utensil is supported upon the first measuring utensil, the second measuring utensil having a second wall, the second wall rigidly connected to the second handle, the second wall having a first bottom configured to align parallel to the first plane along which the first top surface of the first handle extends to level material contained within the basin with the first top perimeter of the first wall when the second measuring utensil is slid with respect to the first measuring utensil, wherein at least one of the first measuring utensil or the second measuring utensil includes indicia indicating a volume of at least the basin, wherein the indicia is included on the second measuring utensil and indicates a combined volume of the first measuring utensil and the second measuring utensil.

11. The self-leveling measuring device as recited in claim 10, wherein the second handle includes a second top surface extending longitudinally along a second plane, the first bottom of the second wall configured to extend around the first top perimeter of the first wall, the second wall having a second top perimeter aligned parallel to the second plane along which the second top surface of the second handle extends.

12. The self-leveling measuring device as recited in claim 11, further comprising a third measuring utensil configured to be supported upon the second measuring utensil and to slide with respect to the second measuring utensil, the third measuring utensil having a third handle including a second bottom surface configured to extend longitudinally along the second plane of the second top surface of the second handle when the third measuring utensil is supported upon the second measuring utensil, the third measuring utensil having a third wall, the third wall rigidly connected to the third handle, the third wall having a second bottom configured to align parallel to the second plane along which the second top surface of the second handle extends to level material contained within the basin and the second wall with the second top perimeter of the second wall when the third measuring utensil is slid with respect to the second measuring utensil.

13. The self-leveling measuring device as recited in claim 10, wherein the first measuring utensil and the second measuring utensil are biased into an orientation with respect to one another where the first top perimeter of the first wall and the first bottom of the second wall are aligned.

14. The self-leveling measuring device as recited in claim 10, wherein the first measuring utensil and the second measuring utensil are biased into an orientation with respect to one another by a first magnet in the first handle of the first measuring utensil and a second magnet in the second handle of the second measuring utensil.

15. The self-leveling measuring device as recited in claim 14, wherein the first magnet has a different magnetic strength than the second magnet.

16. A self-leveling measuring device, comprising:
a first measuring utensil having a first handle including a first top surface extending longitudinally along a first plane, the first measuring utensil defining a basin having a first specified volume, the basin defined by a base and a first wall surrounding the base, the first wall rigidly connected to the first handle, the first wall extending from the base and having a first top perimeter aligned parallel to the first plane along which the first top surface of the first handle extends;
a second measuring utensil configured to be supported upon the first measuring utensil and to slide with respect to the first measuring utensil, the second measuring utensil having a second handle including a first bottom surface configured to extend longitudinally along the first plane of the first top surface of the first handle when the second measuring utensil is supported upon the first measuring utensil, the second measuring utensil having a second wall, the second wall rigidly connected to the second handle, the second wall having a first bottom configured to align parallel to the first plane along which the first top surface of the first handle extends to level material contained within the basin with the first top perimeter of the first wall when the second measuring utensil is slid with respect to the first measuring utensil, wherein at least one of the first measuring utensil or the second measuring utensil includes indicia indicating a volume of at least the basin, wherein the second handle includes a second top surface extending longitudinally along a second plane, the first bottom of the second wall configured to extend around the first top perimeter of the first wall, the second wall having a second top perimeter aligned parallel to the second plane along which the second top surface of the second handle extends; and a third measuring utensil configured to be supported upon the second measuring utensil and to slide with respect to the second measuring utensil, the third measuring utensil having a third handle including a second bottom surface configured to extend longitudinally along the second plane of the second top surface of the second handle when the third measuring utensil is supported upon the second measuring utensil, the third measuring utensil having a third wall, the third wall rigidly connected to the third handle, the third wall having a second bottom configured to align parallel to the second plane along which the second top surface of the second handle extends to level material contained within the basin and the second wall with the second top perimeter of the second wall when the third measuring utensil is slid with respect to the second measuring utensil.

* * * * *